(12) United States Patent
Cheruku et al.

(10) Patent No.: US 8,427,198 B1
(45) Date of Patent: Apr. 23, 2013

(54) REDUCED QUANTIZATION ERROR I/O RESISTOR CALIBRATOR

(75) Inventors: Sridhar Cheruku, Bangalore (IN); Sivaramakrishnan Subramanian, Bangalore (IN); Nidhir Kumar, Bangalore (IN)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 13/327,996

(22) Filed: Dec. 16, 2011

(51) Int. Cl.
*H03K 17/16* (2006.01)

(52) U.S. Cl.
USPC .......................................................... 326/30

(58) Field of Classification Search .................. 326/30
See application file for complete search history.

(56) References Cited

U.S. PATENT DOCUMENTS

| 7,692,446 | B2 * | 4/2010 | Lee et al. | 326/30 |
| 7,986,161 | B2 * | 7/2011 | Lee et al. | 326/30 |
| 2008/0048714 | A1 * | 2/2008 | Lee et al. | 326/30 |
| 2009/0146683 | A1 * | 6/2009 | Kim | 326/30 |

OTHER PUBLICATIONS

Koo et al., "A Versatile I/O with Robust Impedance Calibration for Various Memory Interfaces", *IEEE*, 2006, pp. 1003-1006.

* cited by examiner

*Primary Examiner* — Shawki Ismail
*Assistant Examiner* — Thienvu V Tran
(74) *Attorney, Agent, or Firm* — Nixon & Vanderhye P.C.

(57) ABSTRACT

Calibration circuitry 42 for an off-chip driver circuit 4 and/or an on-die termination circuit 8 is provided using a parallel network of main transistors controlled by a N-bit calibration value. During the calibration operation, the N-bit calibration value is varied until a threshold impedance value is crossed by the combination of the main transistors. A rounding transistor 52 is then used to determine which of the N-bit calibration values produces a combined impedance closest to the designed threshold impedance.

22 Claims, 8 Drawing Sheets

US 8,427,198 B1

REDUCED QUANTIZATION ERROR I/O RESISTOR CALIBRATOR

BACKGROUND OF THE INVENTION

1. Field of the Invention

This invention relates to the field of data transfer circuits. More particularly, this invention relates to a technique of calibrating an impedance of a data transfer circuit.

2. Description of the Prior Art

It is known to provide data transfer circuits, such as off-chip driver circuits and on-die termination circuits, associated with integrated circuits that have a requirement that their impedance is accurately matched to some known level. One example is in the case of double data rate memory (DDR memory) in which data transfers happen at both edges of the clock signal and the timing constraints are critical for correct data transfer. A competing factor is that as process geometries become smaller there is a great degree of variation in the performance of the circuits across PVT (process, voltage and temperature).

In order to address the above requirements it is known to provide calibration circuits in association with data transfer circuits. FIG. 1 of the accompanying drawings schematically illustrates a DDR memory integrated circuit 2 including a plurality of off-chip driver circuits 4 connected via pads 6 to circuitry external of the integrated circuit 2. In a similar manner, on-die termination circuits 8 are connected via pads 10 to other off-chip circuitry. Calibration circuitry 12, 14 associated respectively with the on-die termination circuits 8 and the off-chip driver circuits 4 are used to generate respective calibration signals supplied to the on-die termination circuits 8 and the off-chip driver circuits 4.

FIG. 2 of the accompanying drawings schematically illustrates a data transfer circuit in the form of an off-chip driver circuit 4 that is responsive to a calibration signal in the form of a 4-bit signal [P3:P0] supplied to the P-type transistors driving the pad 6 via a poly resistor 16. Another 4-bit calibration value [N3:N0] is used to control the N-type transistors driving the pad 6 via a different poly resistor. The 4-bit calibration value for the P-type transistors is used to switch main transistors 20, 22, 24, 26 between a high impedance state and a low impedance state. These transistors have different sizes (width) and may conveniently be provided to have impedances that vary by a factor of two between each other. Thus, main transistor 26 has an size of X and an impedance of 8Y when it is in its low impedance state whereas transistors 24, 22 and 20 respectively have impedances of 4Y, 2Y and Y when they are in their low impedance state. The transistor can be considered to have an effectively infinite impedance when in their high impedance state (i.e. switched off). The same arrangement applies in respect of the N-type transistors also illustrated in FIG. 2. By varying the 4-bit calibration values supplied to the circuitry of FIG. 2, the output impedance of this off-chip driver circuit 4 may be varied. The total impedance is given by the poly resistors 16, 18 with their respective main transistors subject to the calibration value control in order to fine-tune the impedance to a desired level.

FIG. 3 of the accompanying drawings schematically illustrates a portion of calibration circuitry 14. This calibration circuitry also includes main transistors 28, 30, 32 and 34 of different physical sizes and accordingly different impedances that are controlled by different bit signals within a 4-bit calibration value. A poly resistor 38 connects the main transistors 28, 30, 32, 34 to a pad 36 and on to an off-chip resistor 40 with a known value, such as $R_{external}$ Ohms. In operation, the 4-bit calibration value is changed to different values to produce different combinations of the main transistors 28, 30, 32, 34 being in their low impedance state as opposed to their high impedance state.

FIG. 4 of the accompanying drawings illustrates, using a voltage waveform having a stair case form, the operation of the calibration circuitry of FIG. 3. In particular, different calibration values are applied in a sequence starting from "1111" and decrementing as a binary number. Each of these different calibration values will produce a different combined impedance for the main transistors 28, 30, 32, 34 which are connected in parallel. The calibration circuitry monitors the voltage at the pad 36 and when this crosses the midway point between ground and the supply voltage DVdd, then this indicates (in this example embodiment) that the combined impedance being calibrated has the desired relationship with the external predetermined resistor 40.

FIG. 5 and FIG. 6 of the accompanying drawings are voltage waveforms that illustrate the situation in which the combined impedances monotonically varied until a threshold impedance is crossed corresponding to the midway voltage between the supply and the ground being measured at the pad 36. The calibration value determined is the value which resulted in the threshold impedance being crossed. This calibration value is then supplied to at least the nearby off-chip driver circuits 4 to control their impedance.

SUMMARY OF THE INVENTION

Viewed from one aspect the present invention provides a method of calibrating an impedance for a data transfer circuit using a calibration circuit having a plurality of main transistors respectively switched between a high impedance state and a low impedance state by a respective bit value signal of an N-bit calibration value, said plurality of main transistors being arranged in parallel with each other and a rounding transistor to provide a combined impedance, said method comprising the steps of:

(a) setting a default value for an impedance of said rounding transistor and a current N-bit calibration value to a first value in a sequence of N-bit calibration values corresponding to a monotonically changing combined impedance;

(b) detecting if said combined impedance has crossed a threshold value and one of:

(i) if said combined impedance has not crossed said threshold impedance, then setting said current N-bit calibration value to a next value in said sequence and repeating step (b); and (ii) if said combined impedance has crossed said threshold value, then:

(1) selecting a value for said N-bit calibration value and changing said impedance of said rounding transistor from said default value to a changed value to provide a further combined impedance with a magnitude between said combined impedance that crossed said threshold value and a preceding impedance value that did not cross said threshold value;

(2) detecting if said further combined impedance value remains as crossed said threshold value and one of (A) if said further combined impedance remains as crossed said threshold value, then setting as a determined N-bit calibration value that value of said calibration N-bit value corresponding to said preceding combined impedance that did not cross said threshold value; and (B) if said further combined impedance does not remains as crossed said threshold value, then setting as a determined N-bit calibration value that value of said calibration N-bit value corresponding to said combined impedance that did cross said threshold value.

The present technique recognises and solves a problem illustrated in FIGS. 5 and 6. In particular, in some circumstances the threshold impedance may be close to the determined calibration value as this calibration value only just managed to produce an impedance which exceeded the threshold impedance. However, it is likely that in many cases the determined calibration value may produce an impedance far away from the threshold impedance. The calibration value can be considered to have a quantisation error associated therewith. One way of dealing with such a quantisation error would be to increase the number of bits within the calibration value. However, such an appropriate would increase the circuit area within the data transfer circuits as these would all need to incorporate a higher number of main transistors and would also increase the number of signals forming the calibration value that need to be routed to each of the data transfer circuits.

The technique of the present disclosure addresses this problem by providing within the calibration circuit 12, 14 an additional rounding transistor which may be used once the threshold impedance has been crossed to determine which of the two calibration values which result in combined impedances either side of the threshold impedance is closer to that threshold impedance. The calibration value giving the closest combined impedance to the threshold impedance can then be used even though it may result in a combined impedance which does not cross the threshold impedance.

The lowest impedance for the rounding transistor in one of its default value and its changed value may conveniently be greater than the highest impedance of any of the plurality of main transistors in their low impedance state. Thus, the rounding transistor provides a finer degree of resolution (e.g. an extra bit of resolution) with this being used to determine which of the calibration values supplied to the main transistors should be adopted as it results in a combined impedance closest to the threshold impedance.

In some embodiments the lowest impedance (i.e. its switch on impedance) of the rounding transistor may be substantially twice the highest impedance of any of the plurality of main transistors in said low impedance state (i.e. its switch on impedance).

It will be appreciated that the monotonically changing combined impedance which is produced by the action of the calibration circuitry may be a monotonically increasing combined impedance or a monotonically decreasing combined impedance. In each of these cases, a crossing of a threshold impedance may be detected. The default value and the changed value for the rounding transistor may be such that the default value is a higher impedance than the changed value or that the default value is a lower impedance than the changed value (i.e. the rounding transistor is normally switched off or switched on until the threshold impedance has been crossed). In dependence on whether the combined impedance is monotonically increasing or decreasing to reach the threshold impedance, a different combination of default value and changed values for the rounding transistor impedance may be employed and similarly which N-bit calibration value is selected to be combined with the changed value of the rounding transistor impedance before a determination is made as to whether or not the threshold impedance is crossed by the further combined impedance established in the fine-tuning step employing the rounding transistor.

It will be appreciated that the data transfer circuit could take a variety of different forms. Examples of such forms are an on-chip driver circuit and an on-die termination circuit, which may themselves be used within a double data rate memory.

The N-bit calibration value which is determined in accordance with the above technique may be supplied to one or more data transfer circuits each containing a plurality of main transistors switched by the determined N-bit calibration value and corresponding in size and characteristics to the plurality of main transistors of the calibration circuit. This is similar to the way in which the main transistors 20, 22, 24, 26 of FIG. 2 match the main transistors 28, 30, 32 and 34 of FIG. 3.

The data transfer circuits themselves need not include a rounding transistor as this rounding transistor is only used and driven within the calibration circuitry. This saves area within the data transfer circuits. There will be typically be many data transfer circuits controlled by a single calibration circuit.

The calibration circuit may be found within an integrated circuit and the combined impedance connected in series via an internal impedance and a pad of the integrated circuit to a known impedance device external to the integrated circuit. This permits calibration relative to the known impedance device external to the integrated circuit which will not be subject to the PVT variations associated with the integrated circuit itself.

In some embodiments the voltage drop across the combined impedance and the internal impedance may be compared to a voltage drop across the known impedance device. When these two voltage drops are substantially equal, this corresponds to the threshold impedance which is detected by the calibration circuit.

The impedances of the different main transistors may form a sequence of main transistors having respective differences in impedance between their high impedance state and their low impedance state that vary by substantially a power of two between different members of the sequence of main transistors.

It will be appreciated that the coding of the calibration value need not necessary follow a standard incrementing or decrementing binary number depending upon which bits of the calibration value control which main transistors and the relative sizes of those transistors. All these variations are encompassed by the present techniques.

The plurality of main transistors and the rounding transistors may be PFET transistors and/or NFET transistors for respectively testing the calibration of the circuitry which drives a pad of an integrated circuit high or low or receives a signal in which the pad of an integrated circuit has been driven high or low.

Viewed from another aspect the present invention provides an integrated circuit having a data transfer circuit calibrated using a calibration circuit, said calibration circuit comprising: a plurality of main transistors and a rounding transistor, said plurality of main transistor respectively switched between a high impedance state and a low impedance state by a respective bit value signal of an N-bit calibration value, said plurality of main transistors being arranged in parallel with each other and said rounding transistor to provide a combined impedance; and calibration control circuitry configured to generate said N-bit calibration value, to control impedance of said rounding transistor and to control said calibration circuit to operate:

(a) to set a default value for an impedance of said rounding transistor and a current N-bit calibration value to a first value in a sequence of N-bit calibration values corresponding to a monotonically changing combined impedance;

(b) to detect if said combined impedance has crossed a threshold value and one of:
   (i) if said combined impedance has not crossed said threshold impedance, then to set said current N-bit calibration value to a next value in said sequence and to repeat (b); and
   (ii) if said combined impedance has crossed said threshold value, then:
      (1) to select a value for said N-bit calibration value and to change said impedance of said rounding transistor from said default value to a changed value to provide a further combined impedance with a magnitude between said combined impedance that crossed said threshold value and a preceding impedance value that did not cross said threshold value;
      (2) to detect if said further combined impedance value remains as crossed said threshold value and one of:
         (A) if said further combined impedance remains as crossed said threshold value, then to set as a determined N-bit calibration value that value of said calibration N-bit value corresponding to said preceding combined impedance that did not cross said threshold value; and
         (B) if said further combined impedance does not remains as crossed said threshold value, then to set as a determined N-bit calibration value that value of said calibration N-bit value corresponding to said combined impedance that did cross said threshold value.

Viewed from a further aspect the present invention provides an integrated circuit having a data transfer circuit calibrated using a calibration circuit, said calibration circuit comprising:
a plurality of main transistors and a rounding transistor, said plurality of main transistor respectively switched between a high impedance state and a low impedance state by a respective bit value signal of an N-bit calibration value, said plurality of main transistors being arranged in parallel with each other and said rounding transistor to provide a combined impedance; and
calibration control means for generating said N-bit calibration value, for controlling impedance of said rounding transistor and for controlling said calibration circuit to operate:
(a) to set a default value for an impedance of said rounding transistor and a current N-bit calibration value to a first value in a sequence of N-bit calibration values corresponding to a monotonically changing combined impedance;
(b) to detect if said combined impedance has crossed a threshold value and one of:
   (i) if said combined impedance has not crossed said threshold impedance, then to set said current N-bit calibration value to a next value in said sequence and to repeat (b); and
   (ii) if said combined impedance has crossed said threshold value, then:
      (1) to select a value for said N-bit calibration value and to change said impedance of said rounding transistor from said default value to a changed value to provide a further combined impedance with a magnitude between said combined impedance that crossed said threshold value and a preceding impedance value that did not cross said threshold value;
      (2) to detect if said further combined impedance value remains as crossed said threshold value and one of:
         (A) if said further combined impedance remains as crossed said threshold value, then to set as a determined N-bit calibration value that value of said calibration N-bit value corresponding to said preceding combined impedance that did not cross said threshold value; and
         (B) if said further combined impedance does not remains as crossed said threshold value, then to set as a determined N-bit calibration value that value of said calibration N-bit value corresponding to said combined impedance that did cross said threshold value.

The above, and other objects, features and advantages of this invention will be apparent from the following detailed description of illustrative embodiments which is to be read in connection with the accompanying drawings.

DESCRIPTION OF THE EMBODIMENTS

Figure 1:
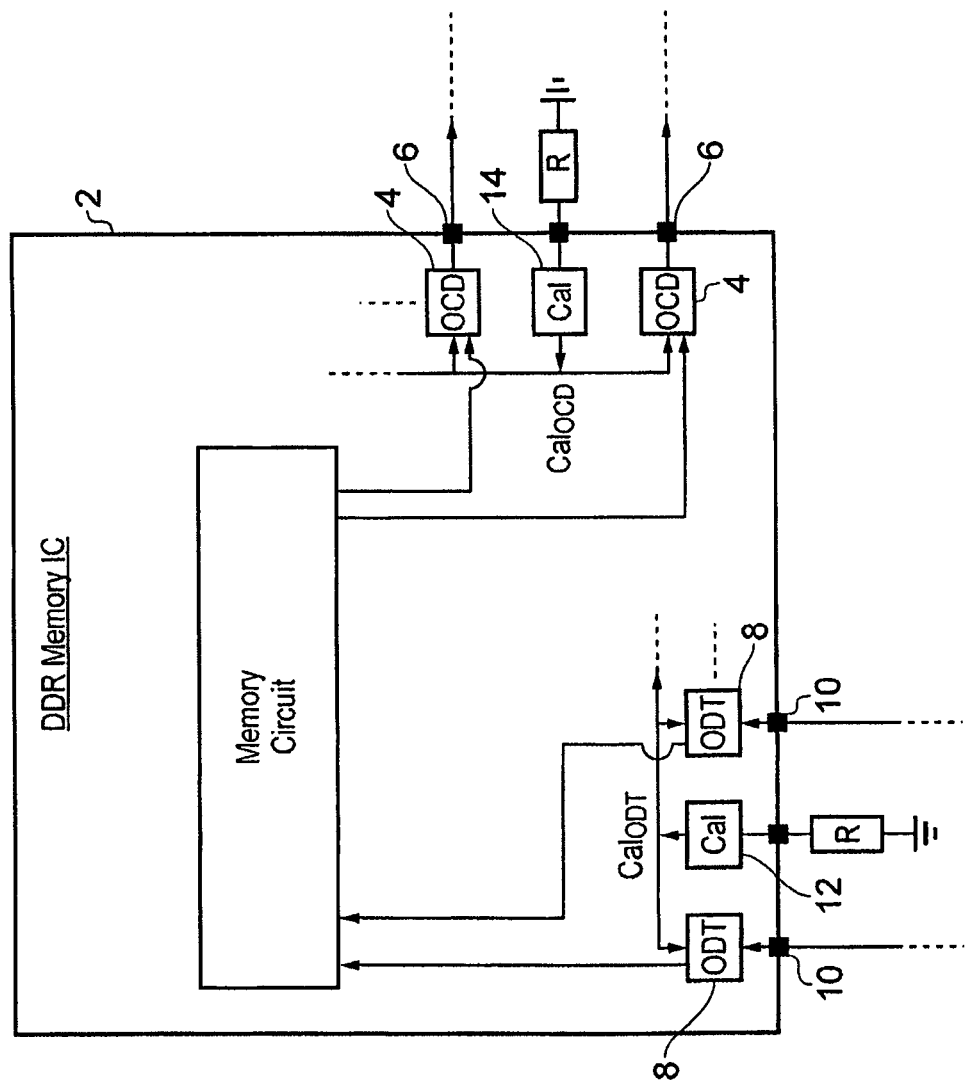
FIG. 1 schematically illustrates an integrated circuit including data transfer circuits with associated calibration circuits.
Figure 2:
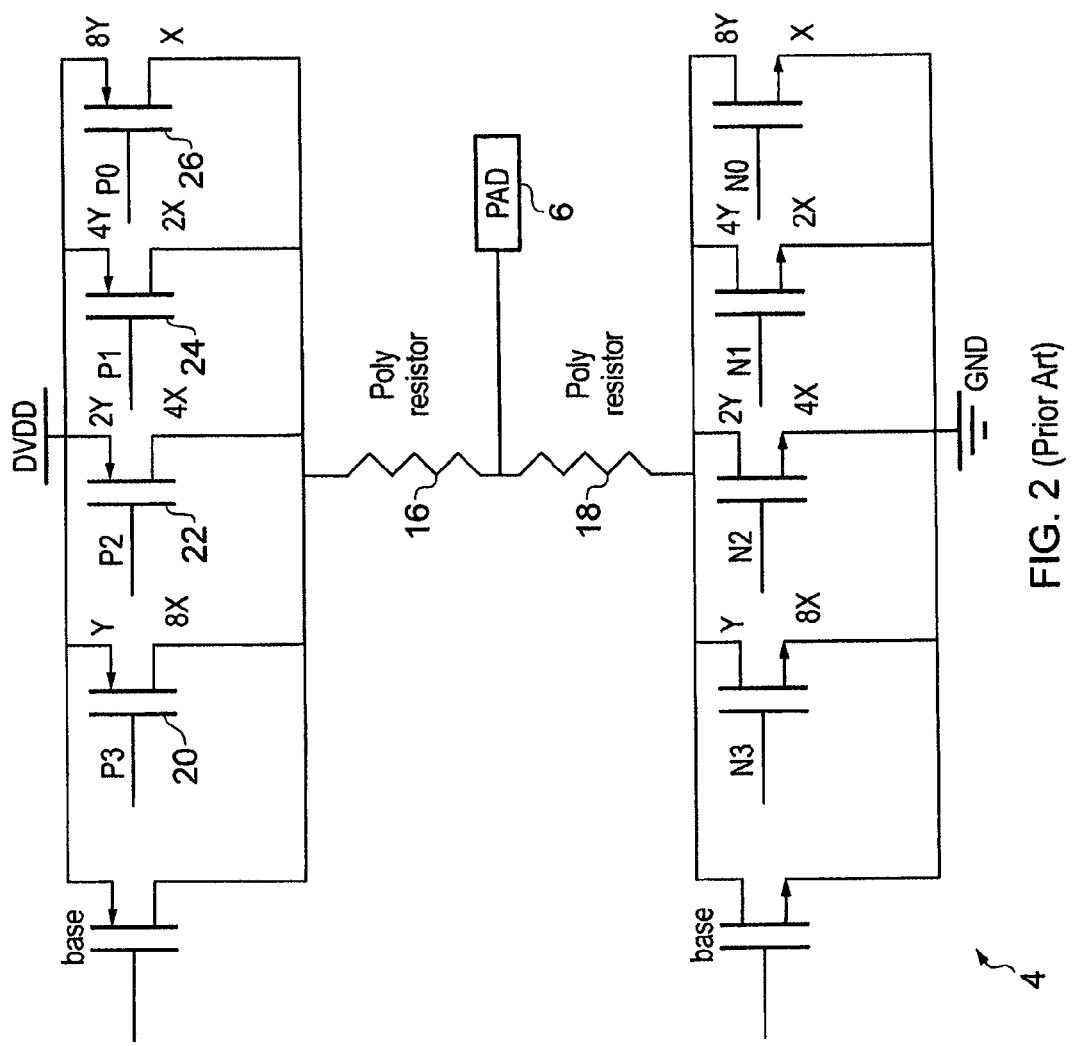
FIG. 2 schematically illustrates a data transfer circuit in the form of an off-chip driver circuit.
Figure 3:
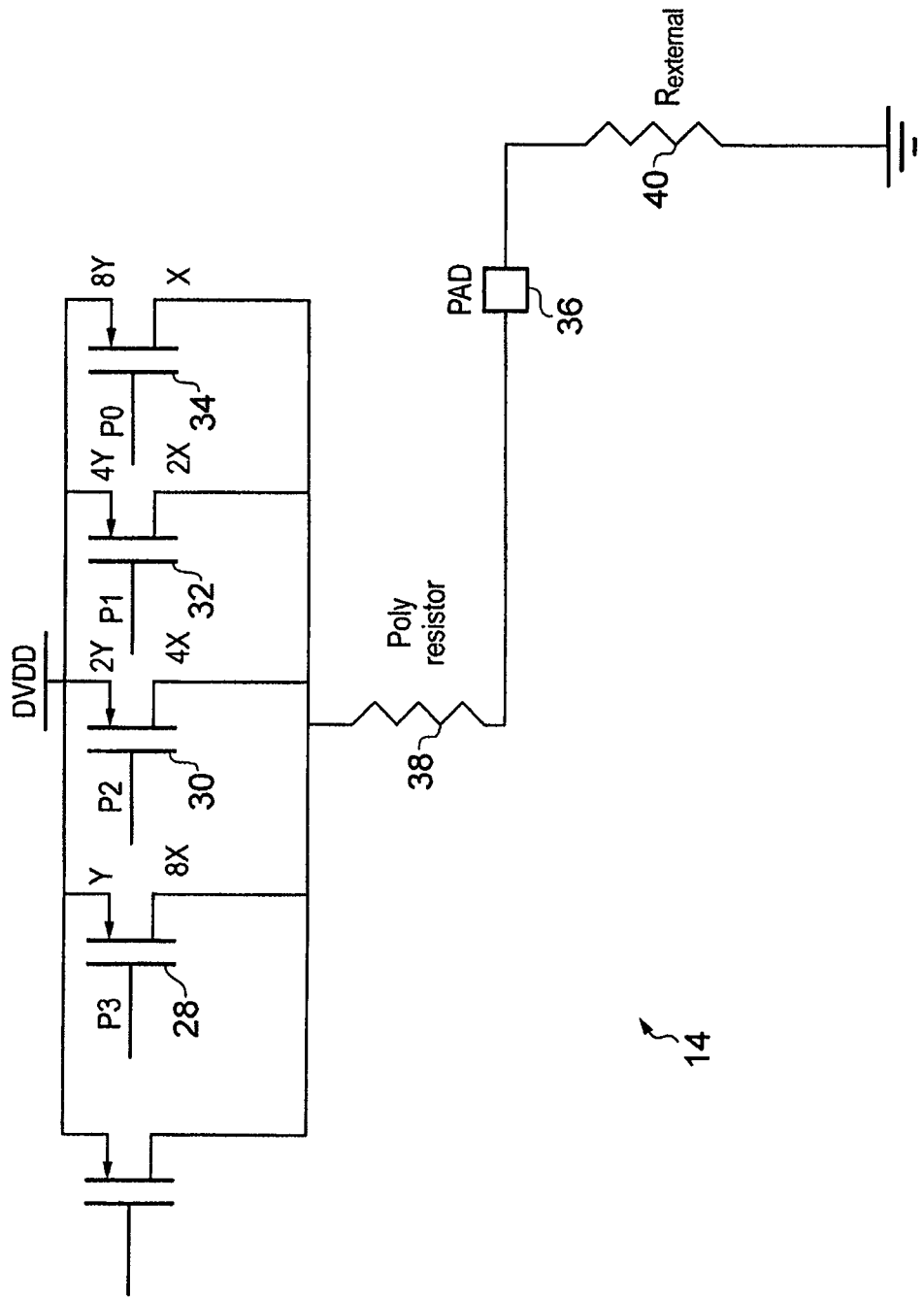
FIG. 3 schematically illustrates a portion of a calibration circuit.
Figure 4:
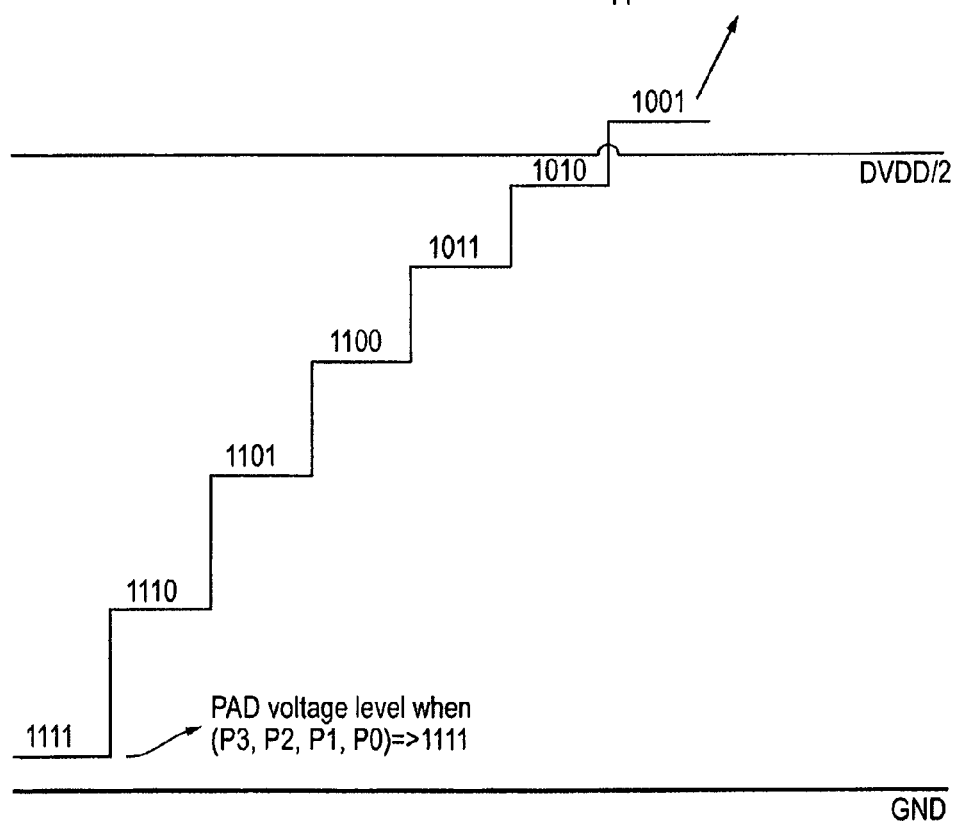
FIGS. 4, 5 and 6 are voltage waveforms that schematically illustrate the operation of the calibration circuit of FIG. 3.
Figure 5:
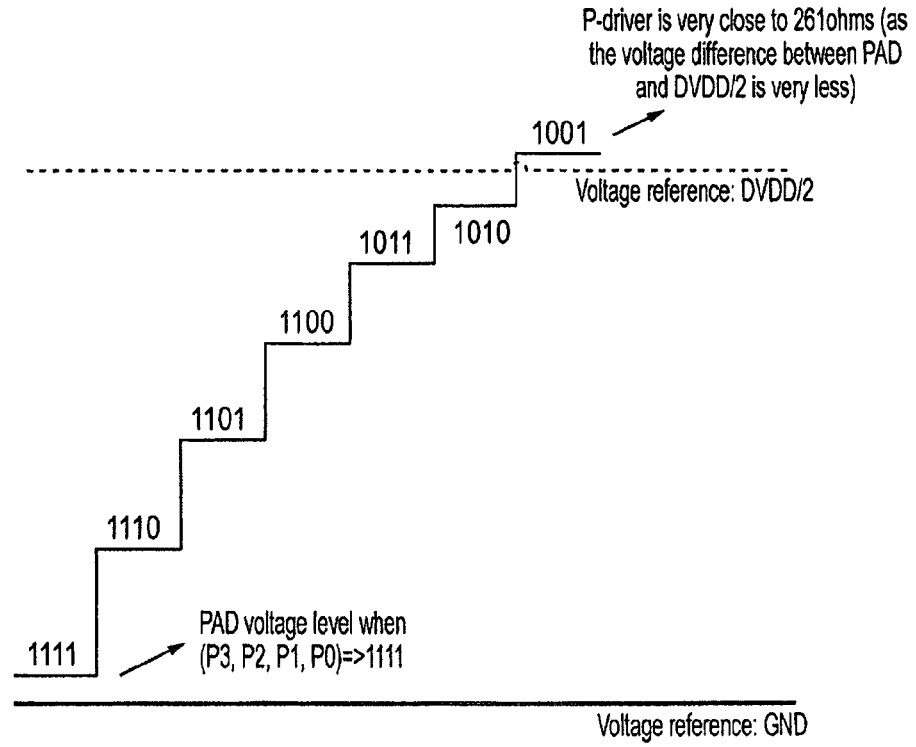
Figure 6:
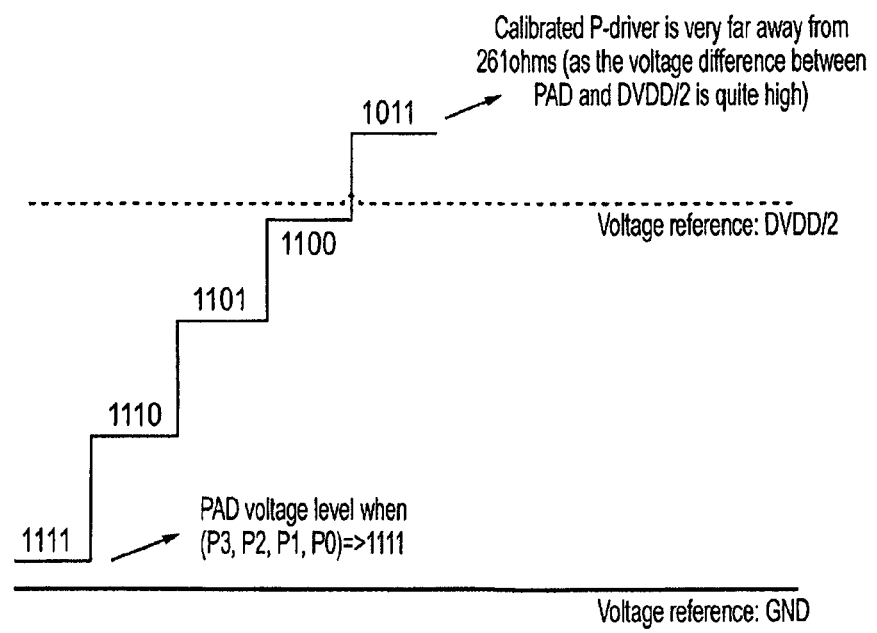
Figure 7:
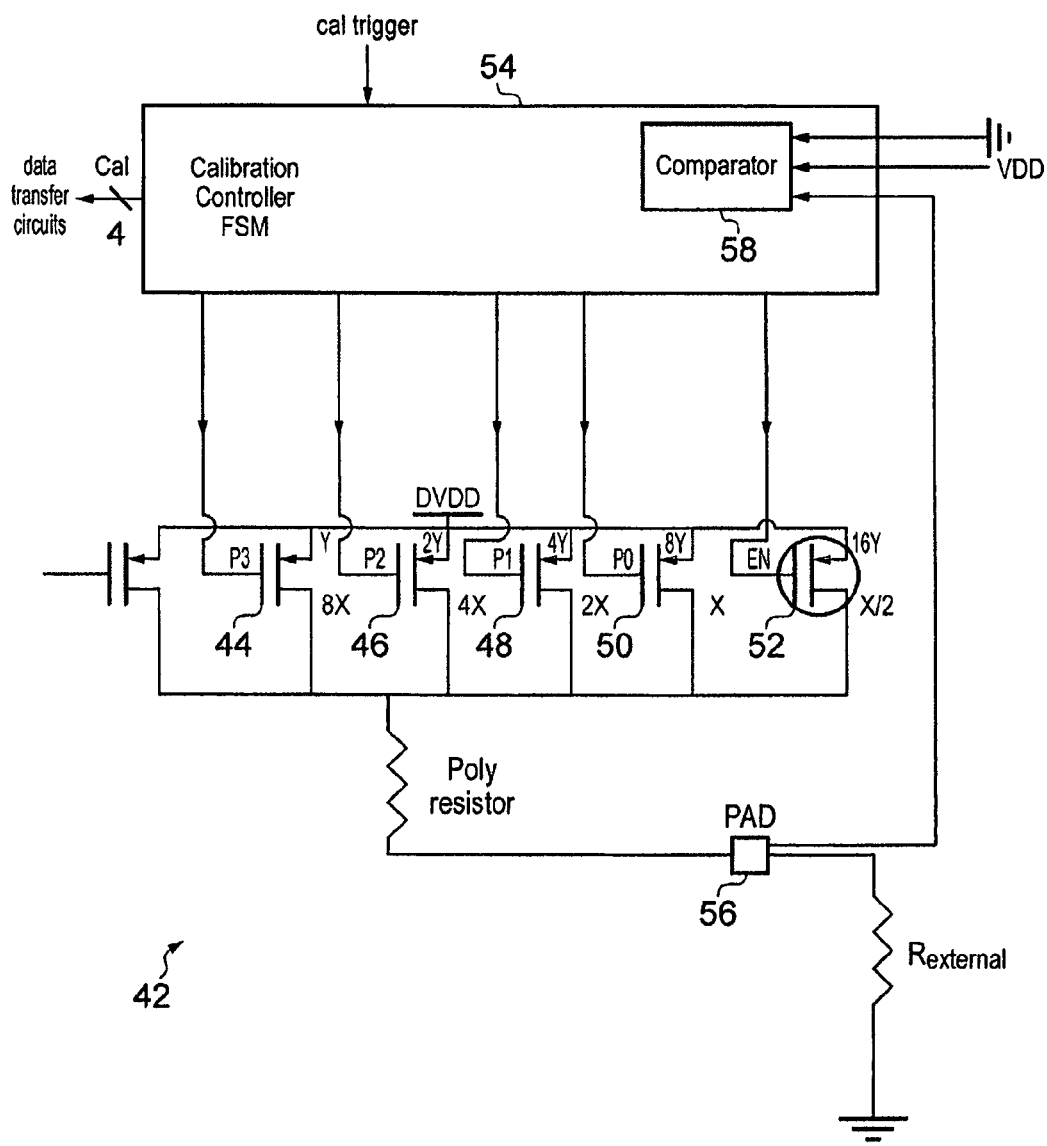
FIG. 7 schematically illustrates a calibration circuit including a rounding transistor.

FIG. 7 schematically illustrates a calibration circuit 42 including a plurality of main transistors 44, 46, 48 and 50 have sizes (widths) ranging from 8X to X that result in respective impedances ranging from Y to 8Y in their low impedance state. A rounding transistor 52 is added in parallel with these main transistors. The rounding transistor 52 has an impedance of 16Y in its low impedance state (i.e. when it is switched on).

In this example embodiment, the default value for the rounding transistor impedance is high and the changed value of the rounding transistor impedance is low. A calibration controller 54 in the form of a finite state machine is responsive to a calibration trigger signal to initiate a calibration process in which the calibration value comprising a 4-bit signal [P3:P0] is determined that will result in the voltage at the pad 56 on the periphery of the integrated circuit including the calibration circuit 42 reaching a voltage level which is substantially midway between the supply voltage VDD and the ground as measured by a comparator circuit 58.

When the two calibration values which straddle the threshold impedance which result in the pad 56 being at this midway voltage have been determined, then the rounding transistor 52 is used to identify which of these two calibration values results in a combined impedance which is closest to the threshold impedance which corresponds to the midway voltage point.

Figure 8:
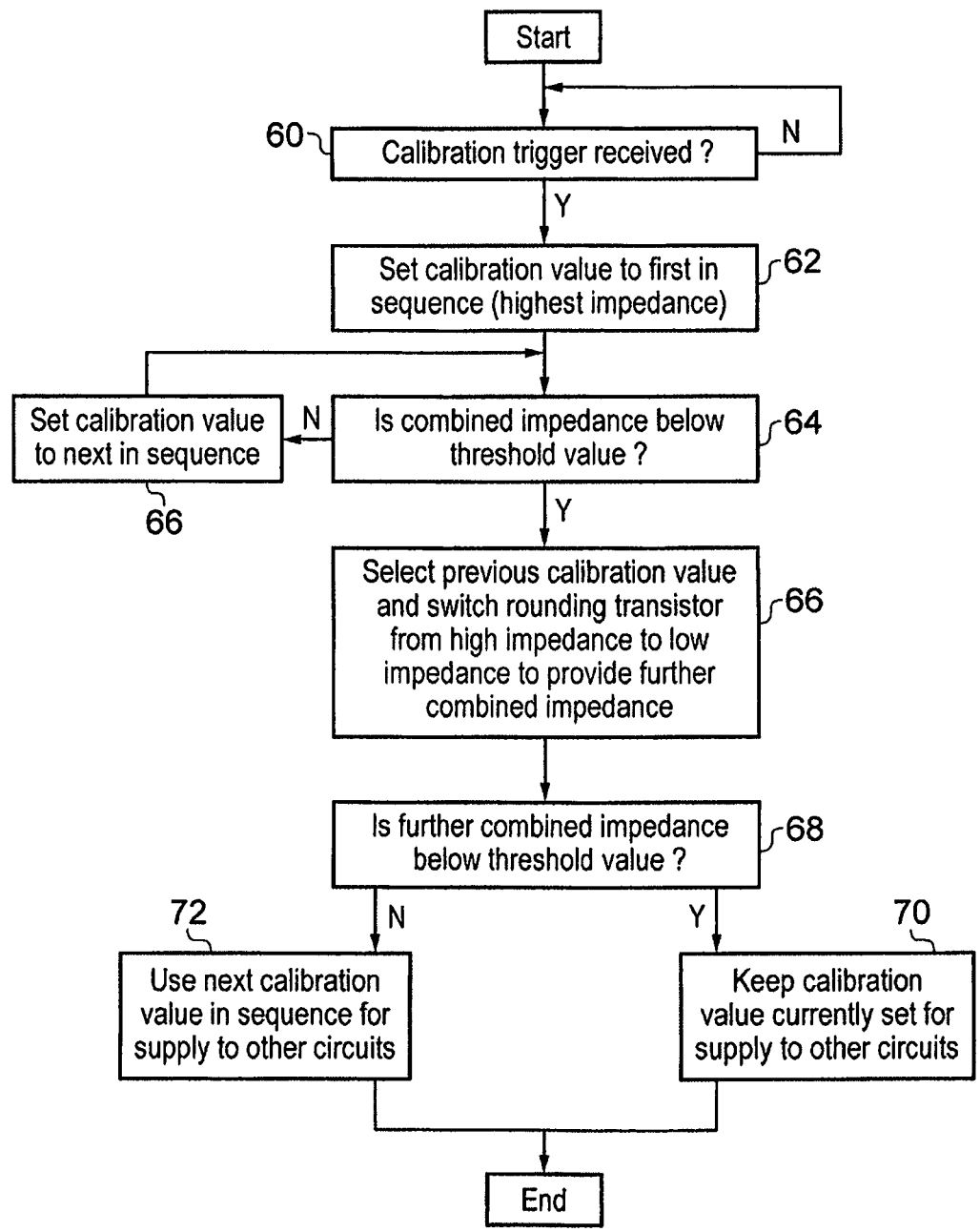
FIG. 8 is a flow diagram schematically illustrating the operation of the calibration circuit of FIG. 7.

The operation of the calibration controller finite state machine 54 will be described further in relation to FIG. 8. FIG. 8 is a flow diagram. At step 60 processing waits until a calibration trigger signal is received. At step 62 the calibration value is set to the first in a sequence of calibration values (a 1111->0000 decrementing sequence). In this example embodiment, this first calibration value corresponds to the highest impedance for the combined impedance. Step 64 determines whether this combined impedance is below a threshold value. The determination at step 64 may be by way of comparing the voltage at the pad 56 with the midway point between the supply voltage Vdd and the ground voltage. Other ways of measuring this combined impedance are also possible.

If the combined impedance is not below the threshold value, then processing proceeds to step 66 and the next calibration value within the sequence of calibration values is set and the test at step 64 is repeated. The calibration value sequence and the arrangement of the main transistors 44, 46, 48 and 50 is such that a monotonic change in the combined impedance results from the movement between the adjacent calibration values within the sequence of calibration values.

When the test at step 64 indicates that the combined impedance has fallen below the threshold value, then processing proceeds to step 66 where the previous calibration value which resulted in a combined impedance just above the threshold value is selected. Thus, if the calibration values have been a decrementing binary number then step 66 increments that the calibration value back by one binary digit. Step 66 also serves to switch the rounding transistor 52 from its high impedance to its low impedance state. In this way, the combination of the main transistors 44, 46, 48 and 50 (driven by the calibration value selected at step 66) combine in parallel with the impedance of the rounding transistor 52 to produce a further combined impedance.

Step 68 compares the further combined impedance with the threshold value and determines whether or not the further combined impedance is below the threshold value. If the further combined impedance is below the threshold value, then step 70 serves to keep the calibration value set at step 66 and use this for supply to the other data transfer circuits subject to the calibration determined by the method of FIG. 8. Step 70 in which the further combined impedance including the rounding transistor switched to its low impedance state results in the threshold being crossed corresponds to the calibration value selected at step 66 producing a combined impedance in the main transistors 44, 46, 48 and 50 alone that was closer to the threshold value than the combined impedance that was detected as falling below that threshold value at step 64.

If the determination at step 68 is that the further combined impedance is not below the threshold value, then processing proceeds to step 72 where the next calibration value in sequence is used (i.e corresponding to the value which crossed the threshold at step 64) for supply to the other data transfer circuits within the integrated circuit. The selection at step 72 corresponds to the calibration value used at step 64 being one which produces a combined impedance which is closer to the threshold impedance than the preceding calibration value.

Figure 9:
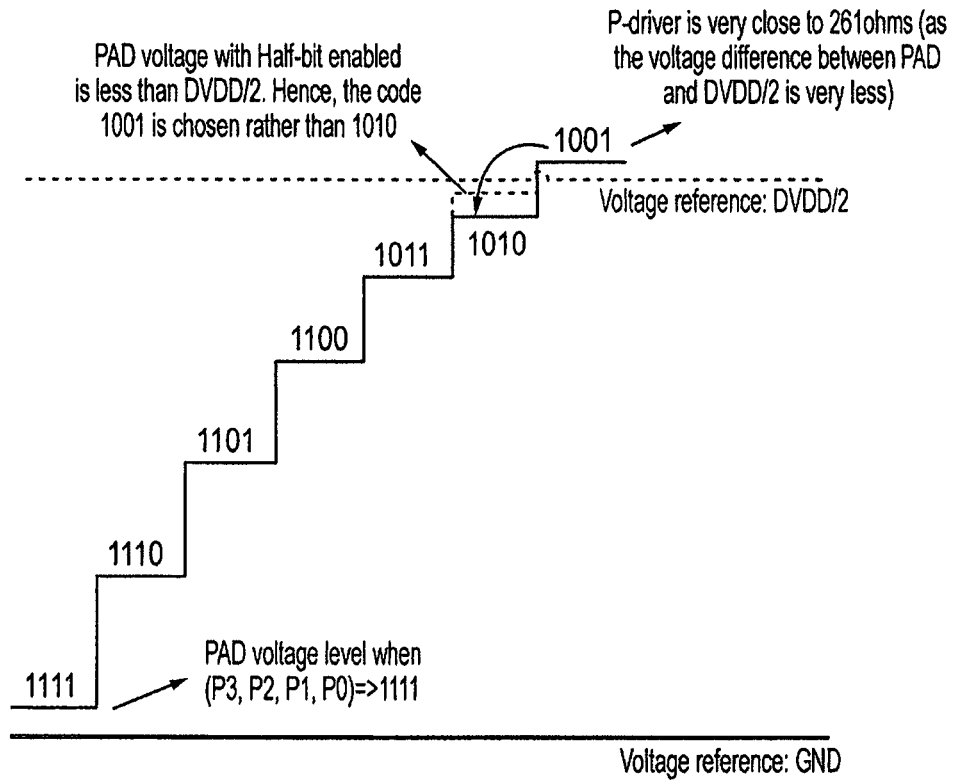
FIGS. 9 and 10 are voltage waveforms that schematically illustrates the operation of the calibration circuit of FIG. 7.
Figure 10:
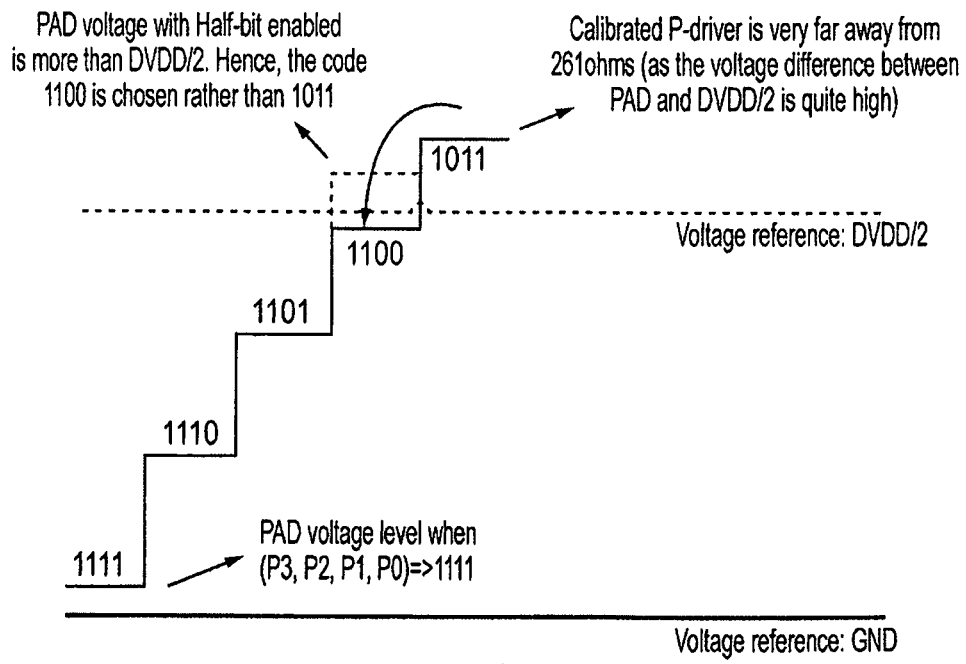

FIGS. 9 and 10 are voltage waveforms that schematically illustrate the operation of the circuitry of FIG. 7. In FIG. 9 the calibration value is decremented until the threshold impedance is crossed corresponding to the measured voltage being half the supply voltage. Once this threshold crossing has been identified, then the calibration value is incremented by one binary digit and the rounding transistor switched into use to switch the further combined impedance to a point substantially halfway between the two previous levels. This further combined impedance is then compared with the threshold impedance (by way of detecting the voltage at the pad). In the situation illustrated in FIG. 9, the further combined impedance is such that the threshold impedance is not crossed. This indicates that the calibration value which first crossed that threshold impedance is closer to the threshold impedance than the preceding calibration value. More specifically, in the example illustrated, the calibration value "1001" produces a combined impedance which is closer to the threshold impedance desired than does a calibration value "1010". Accordingly, a calibration value of "1001" is selected for use and output to the various data transfer circuits controlled by that calibration circuit.

FIG. 10 is similar to FIG. 9 except in this case when the calibration value is incremented following the first crossing of the threshold impedance and the rounding transistor is switched to have its changed impedance, the further combined impedance again crosses the threshold impedance. This indicates that the calibration value preceding the crossing of the threshold impedance for the first time produced a combined impedance that was closer to that threshold impedance and accordingly the calibration value should be chosen to be "1100".

It will be appreciated that the examples of FIGS. 9 and 10 illustrate the situation in which the combined impedance is monotonically varying in one sense. Other embodiments may also be employed in which the combined impedance is varying in the opposite sense. Furthermore, the examples illustrated in FIGS. 9 and 10 are ones in which the action of the rounding transistor 52 when it is switched to its changed value impedance is such that the voltage being measured increases towards the reference voltage. It is also possible that in other embodiments the rounding transistor may be switched in the opposite sense during use of the rounding transistor to fine-tune the calibration value to be selected. It is also possible that instead of changing the calibration value back to the preceding calibration value when performing the fine-tuning, it may be that the calibration value remains the same due to the action of the rounding transistor in moving the further combined impedance back toward the values which did not cross the threshold values. All of these variations are encompassed in the present technique.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of calibrating an impedance for a data transfer circuit using a calibration circuit having a plurality of main transistors respectively switched between a high impedance state and a low impedance state by a respective bit value signal of an N-bit calibration value, said plurality of main transistors being arranged in parallel with each other and a rounding transistor to provide a combined impedance, said method comprising the steps of:
    (a) setting a default value for an impedance of said rounding transistor and a current N-bit calibration value to a first value in a sequence of N-bit calibration values corresponding to a monotonically changing combined impedance;
    (b) detecting if said combined impedance has crossed a threshold value and one of:
        (i) if said combined impedance has not crossed said threshold impedance, then setting said current N-bit calibration value to a next value in said sequence and repeating step (b); and
        (ii) if said combined impedance has crossed said threshold value, then:

(1) selecting a value for said N-bit calibration value and changing said impedance of said rounding transistor from said default value to a changed value to provide a further combined impedance with a magnitude between said combined impedance that crossed said threshold value and a preceding impedance value that did not cross said threshold value;

(2) detecting if said further combined impedance value remains as crossed said threshold value and one of:

(A) if said further combined impedance remains as crossed said threshold value, then setting as a determined N-bit calibration value that value of said calibration N-bit value corresponding to said preceding combined impedance that did not cross said threshold value; and (B) if said further combined impedance does not remains as crossed said threshold value, then setting as a determined N-bit calibration value that value of said calibration N-bit value corresponding to said combined impedance that did cross said threshold value.

2. A method as claimed in claim 1, wherein a lowest impedance for said rounding transistor in one of said default value and said changed value is greater than a highest impedance of any of said plurality of main transistors in said low impedance state.

3. A method as claimed in claim 2, wherein said lowest impedance for said rounding transistor is substantially twice said highest impedance of any of said plurality of main transistor in said low impedance state.

4. A method as claimed in claim 1, wherein crossing said threshold value is exceeding said threshold value.

5. A method as claimed in claim 4, wherein said default value is a higher impedance than said changed value and said selecting selects said N-bit calibration value as that corresponding to said combined impedance that crossed said threshold value such that changing impedance of said rounding transistor to said changed value results in a further combined impedance that is lower than said combined impedance that crossed said threshold value.

6. A method as claimed in claim 4, wherein said default value is a lower impedance than said changed value and said selecting selects said N-bit calibration value as that corresponding to said preceding combined impedance that did not cross said threshold value such that changing impedance of said rounding transistor to said changed value results in a further combined impedance that is higher than said preceding combined impedance that did not cross said threshold value.

7. A method as claimed in claim 1, wherein crossing said threshold value is not exceeding said threshold value.

8. A method as claimed in claim 7, wherein said default value is a higher impedance than said changed value and said selecting selects said N-bit calibration value as that corresponding to said preceding combined impedance that did not cross said threshold value such that changing impedance of said rounding transistor to said changed value results in a further combined impedance that is lower than said preceding combined impedance that did not cross said threshold value.

9. A method as claimed in claim 7, wherein said default value is a lower impedance than said changed value and said selecting selects said N-bit calibration value as that corresponding to said combined impedance that crossed said threshold value such that changing impedance of said rounding transistor to said changed value results in a further combined impedance that is higher than said combined impedance that crossed said threshold value.

10. A method as claimed in claim 1, wherein said data transfer circuit is one of an off-chip driver circuit and an on-die termination circuit.

11. A method as claimed in claim 10, wherein said data transfer circuit is part of a double data rate memory.

12. A method as claimed in claim 1, wherein said determined N-bit calibration value is supplied to one or more data transfer circuits each containing a plurality of main transistors switched by said determined N-bit calibration value and corresponding to said plurality of main transistors of said calibration circuit.

13. A method as claimed in claim 12, wherein said data transfer circuits do not contain a transistor corresponding to said rounding transistor.

14. A method as claimed in claim 1, wherein said calibration circuit is within an integrated circuit and said combined impedance is connected in series via an internal impedance and a pad of said integrated circuit to a known impedance device external to said integrated circuit.

15. A method as claimed in claim 14, wherein a voltage drop across said combined impedance and said internal impedance is compared to a voltage drop across said known impedance.

16. A method as claimed in claim 15, wherein said threshold value corresponds to an impedance value for said combined impedance when a voltage drop across said combined impedance and said internal impedance is equal to a voltage drop across said know impedance.

17. A method as claimed in claim 1, wherein said plurality of main transistors form a sequence of main transistors having respective impedances in their low impedance state that vary by substantially a power of two between different members of said sequence of main transistors.

18. A method as claimed in claim 1, wherein said plurality of main transistor and said rounding transistor are PFET transistors.

19. A method as claimed in claim 1, wherein said plurality of main transistor and said rounding transistor are NFET transistors.

20. A method as claimed in claim 1, wherein said N-bit calibration value corresponds to a monotonically changing binary value.

21. An integrated circuit having a data transfer circuit calibrated using a calibration circuit, said calibration circuit comprising:

a plurality of main transistors and a rounding transistor, said plurality of main transistor respectively switched between a high impedance state and a low impedance state by a respective bit value signal of an N-bit calibration value, said plurality of main transistors being arranged in parallel with each other and said rounding transistor to provide a combined impedance; and calibration control circuitry configured to generate said N-bit calibration value, to control impedance of said rounding transistor and to control said calibration circuit to operate:

(a) to set a default value for an impedance of said rounding transistor and a current N-bit calibration value to a first value in a sequence of N-bit calibration values corresponding to a monotonically changing combined impedance;

(b) to detect if said combined impedance has crossed a threshold value and one of:

(i) if said combined impedance has not crossed said threshold impedance, then to set said current N-bit calibration value to a next value in said sequence and to repeat (b); and (ii) if said combined impedance has crossed said threshold value, then:

(1) to select a value for said N-bit calibration value and to change said impedance of said rounding transistor from said default value to a changed value to provide a further combined impedance with a magnitude between said combined impedance that crossed said threshold value and a preceding impedance value that did not cross said threshold value;

(2) to detect if said further combined impedance value remains as crossed said threshold value and one of:

(A) if said further combined impedance remains as crossed said threshold value, then to set as a determined N-bit calibration value that value of said calibration N-bit value corresponding to said preceding combined impedance that did not cross said threshold value; and (B) if said further combined impedance does not remains as crossed said threshold value, then to set as a determined N-bit calibration value that value of said calibration N-bit value corresponding to said combined impedance that did cross said threshold value.

22. An integrated circuit having a data transfer circuit calibrated using a calibration circuit, said calibration circuit comprising:

a plurality of main transistors and a rounding transistor, said plurality of main transistor respectively switched between a high impedance state and a low impedance state by a respective bit value signal of an N-bit calibration value, said plurality of main transistors being arranged in parallel with each other and said rounding transistor to provide a combined impedance; and calibration control means for generating said N-bit calibration value, for controlling impedance of said rounding transistor and for controlling said calibration circuit to operate:

(a) to set a default value for an impedance of said rounding transistor and a current N-bit calibration value to a first value in a sequence of N-bit calibration values corresponding to a monotonically changing combined impedance;

(b) to detect if said combined impedance has crossed a threshold value and one of:

(i) if said combined impedance has not crossed said threshold impedance, then to set said current N-bit calibration value to a next value in said sequence and to repeat (b); and (ii) if said combined impedance has crossed said threshold value, then:

(1) to select a value for said N-bit calibration value and to change said impedance of said rounding transistor from said default value to a changed value to provide a further combined impedance with a magnitude between said combined impedance that crossed said threshold value and a preceding impedance value that did not cross said threshold value;

(2) to detect if said further combined impedance value remains as crossed said threshold value and one of:

(A) if said further combined impedance remains as crossed said threshold value, then to set as a determined N-bit calibration value that value of said calibration N-bit value corresponding to said preceding combined impedance that did not cross said threshold value; and (B) if said further combined impedance does not remains as crossed said threshold value, then to set as a determined N-bit calibration value that value of said calibration N-bit value corresponding to said combined impedance that did cross said threshold value.

\* \* \* \* \*